(12) United States Patent
Toyoshima et al.

(10) Patent No.: US 7,650,318 B2
(45) Date of Patent: Jan. 19, 2010

(54) BEHAVIOR RECOGNITION USING VECTORS OF MOTION PROPERTIES BASED TRAJECTORY AND MOVEMENT TYPE

(75) Inventors: Ichiro Toyoshima, Tokyo (JP); Naoki Imasaki, Kamakura (JP); Ryohei Orihara, Tokyo (JP); Hideki Kobayashi, Yokohama (JP); Takashi Koiso, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 500 days.

(21) Appl. No.: 11/713,802

(22) Filed: Mar. 5, 2007

(65) Prior Publication Data
US 2007/0244630 A1 Oct. 18, 2007

(30) Foreign Application Priority Data
Mar. 6, 2006 (JP) .............................. 2006-059923

(51) Int. Cl.
*G06F 15/18* (2006.01)
*G06T 7/20* (2006.01)
*G06T 7/60* (2006.01)

(52) U.S. Cl. .................. 706/18; 382/103; 382/107; 348/143; 348/150

(58) Field of Classification Search .................. 706/45; 348/113
See application file for complete search history.

(56) References Cited

U.S. PATENT DOCUMENTS

| 7,036,094 B1 * | 4/2006 | Cohen et al. ............... 715/863 |
| 7,042,809 B2 * | 5/2006 | Mignot ....................... 368/223 |
| 7,050,606 B2 * | 5/2006 | Paul et al. ................... 382/104 |
| 7,269,516 B2 * | 9/2007 | Brunner et al. ............... 702/19 |
| 7,386,105 B2 * | 6/2008 | Wasserblat et al. ..... 379/114.14 |
| 2002/0126876 A1 * | 9/2002 | Paul et al. ................... 382/104 |
| 2003/0039379 A1 * | 2/2003 | Gutta et al. .................. 382/116 |
| 2003/0048926 A1 * | 3/2003 | Watanabe .................... 382/103 |

(Continued)

FOREIGN PATENT DOCUMENTS

JP    8-329247    12/1996

(Continued)

OTHER PUBLICATIONS

Ali, A.; Aggarwal, J.K., "Segmentation and recognition of continuous human activity," Detection and Recognition of Events in Video, 2001. Proceedings. IEEE Workshop on , vol., no., pp. 28-35, 2001.*

(Continued)

*Primary Examiner*—David R Vincent
*Assistant Examiner*—David H Kim
(74) *Attorney, Agent, or Firm*—Nixon & Vanderhye, PC

(57) ABSTRACT

According to an aspect of the present invention, there is provided with a behavior determining apparatus including: an elemental-behavior extracting unit configured to extract, from trajectory data in which positions of a traveling body in an observation area are held at predetermined time intervals, L (L is an integer equal to or larger than 1) elemental behavior quantities among a stopping time, a stop frequency, a walking time, a running time, a direction change frequency, a sum of angle change quantities at the times when the traveling body changes a traveling direction, a sum of absolute values of angle change quantities at the times when the traveling body changes a traveling direction, a gravitational center set vector, and a pre-stop average speed; and a behavior determining unit configured to determine a behavior of the traveling body from the L elemental behavior quantities.

15 Claims, 16 Drawing Sheets

U.S. PATENT DOCUMENTS

| | | | |
|---|---|---|---|
| 2003/0107650 A1* | 6/2003 | Colmenarez et al. | 348/150 |
| 2003/0208289 A1* | 11/2003 | Ben-Arie | 700/61 |
| 2004/0131254 A1* | 7/2004 | Liang et al. | 382/181 |
| 2004/0141635 A1* | 7/2004 | Liang et al. | 382/110 |
| 2004/0141636 A1* | 7/2004 | Liang et al. | 382/110 |
| 2005/0128298 A1* | 6/2005 | Rottmann | 348/169 |
| 2006/0210112 A1* | 9/2006 | Cohen et al. | 382/103 |
| 2006/0222206 A1* | 10/2006 | Garoutte | 382/103 |

OTHER PUBLICATIONS

Kojima, A., Tamura, T., and Fukunaga, K. 2002. Natural Language Description of Human Activities from Video Images Based on Concept Hierarchy of Actions. Int. J. Comput. Vision 50, 2 (Nov. 2002), 171-184.*

Mori, T.; Tsujioka, K.; Shimosaka, M.; Sato, T., "Human-like action recognition system using features extracted by human," Intelligent Robots and System, 2002. IEEE/RSJ International Conference on , vol. 2, no., pp. 1214-1220 vol. 2, 2002.*

Robert Bodor and Bennett Jackson and Nikolaos Papanikolopoulos. Vision-based human tracking and activity recognition. Proc. of the 11th Mediterranean Conf. on Control and Automation. Jun. 2003.*

Liang Wang, Weiming Hu, Tieniu Tan, Recent developments in human motion analysis, Pattern Recognition, vol. 36, Issue 3, Mar. 2003, pp. 585-601.*

Boyd, J. E. and Little, J. J. 1997. Global Versus Structured Interpretation of Motion: Moving Light Displays. In Proceedings of the 1997 IEEE Workshop on Motion of Non-Rigid and Articulated Objects (NAM '97) (Jun. 16-Jul. 16, 1997). NAM. IEEE Computer Society, Washington, DC, 18.*

Yamato, J.; Ohya, J.; Ishii, K., "Recognizing human action in time-sequential images using hidden Markov model," Computer Vision and Pattern Recognition, 1992. Proceedings CVPR '92., 1992 IEEE Computer Society Conference on , vol., no., pp. 379-385, Jun. 15-18, 1992.*

Dollar, P.; Rabaud, V.; Cottrell, G.; Belongie, S., "Behavior recognition via sparse spatio-temporal features," Visual Surveillance and Performance Evaluation of Tracking and Surveillance, 2005. 2nd Joint IEEE International Workshop on , vol., no., pp. 65-72, Oct. 15-16, 2005.*

Polana, R. B. and Nelson, R. C. 1995 Nonparametric Recognition of Nonrigid Motion. Technical Report. UMI Order No. TR575., University of Rochester.*

Mori et al, downloaded from http://research.nii.ac.jp/kaken-johogaku/reports/H15_A03/A03-28_Mori.pdf (2003).

* cited by examiner

ELEMENTAL BEHAVIOR QUANTITIES
TO BE EXTRACTED

1. STOPPING TIME ST
2. STOP FREQUENCY SE
3. WALKING TIME WT
4. RUNNING TIME RT
5. DIRECTION CHANGE FREQUENCY CE
6. SUM OF ANGLE CHANGE QUANTITIES Q
7. SUM OF ABSOLUTE VALUES OF ANGLE CHANGE QUANTITIES QA
8. GRAVITATIONAL CENTER SET VECTOR G
9. PRE-STOP AVERAGE SPEED BS

FIG. 2

| NUMBER | DIRECTIONAL VECTOR X COMPONENT | DIRECTIONAL VECTOR Y COMPONENT |
|---|---|---|
| 1 | 1 | 2.2 |
| 2 | 1 | 1.9 |
| 3 | 2 | -1.9 |
| 4 | 1.8 | 1.8 |
| 5 | 0.2 | -3 |
| 6 | 0.1 | 1 |
| 7 | -2 | 5 |
| 8 | 3.9 | 1 |
| 9 | 1 | 1 |

CALCULATION OF DIRECTIONAL VECTOR SEQUENCE V

| NUMBER | X COODINATE | Y COODINATE |
|---|---|---|
| 1 | 1.0 | 1.0 |
| 2 | 2.0 | 3.2 |
| 3 | 3.0 | 5.1 |
| 4 | 5.0 | 3.2 |
| 5 | 6.8 | 5.0 |
| 6 | 7.0 | 2.0 |
| 7 | 7.1 | 3.0 |
| 8 | 5.1 | 8.0 |
| 9 | 9.0 | 9.0 |
| 10 | 10.0 | 10.0 |

| NUMBER | NORM SEQUENCE |
|---|---|
| 1 | 2.417 |
| 2 | 2.147 |
| 3 | 2.759 |
| 4 | 2.546 |
| 5 | 3.007 |
| 6 | 1.005 |
| 7 | 5.385 |
| 8 | 4.026 |
| 9 | 1.414 |

CALCULATION OF STOP BEHAVIOR SEQUENCE

- Th stop&walk=3.0
- F=2

| NUMBER | STOP BEHAVIOR SEQUENCE |
|---|---|
| 1 | 1 |
| 2 | 1 |
| 3 | 1 |
| 4 | 1 |
| 5 | 0 |
| 6 | 0 |
| 7 | 0 |
| 8 | 0 |
| 9 | 0 |

| NUMBER | NORM SEQUENCE |
|---|---|
| 1 | 2.417 |
| 2 | 2.147 |
| 3 | 2.759 |
| 4 | 2.546 |
| 5 | 3.007 |
| 6 | 1.005 |
| 7 | 5.385 |
| 8 | 4.026 |
| 9 | 1.414 |

| NUMBER | STOP BEHAVIOR SEQUENCE |
|---|---|
| 1 | 1 |
| 2 | 1 |
| 3 | 1 |
| 4 | 1 |
| 5 | 0 |
| 6 | 0 |
| 7 | 0 |
| 8 | 0 |
| 9 | 0 |

CALCULATION OF WALK BEHAVIOR SEQUENCE

·Th walk&run=4.0

| NUMBER | WALK BEHAVIOR SEQUENCE |
|---|---|
| 1 | 0 |
| 2 | 0 |
| 3 | 0 |
| 4 | 0 |
| 5 | 1 |
| 6 | 1 |
| 7 | 0 |
| 8 | 0 |
| 9 | 1 |

| NUMBER | WALK BEHAVIOR SEQUENCE |
|---|---|
| 1 | 0 |
| 2 | 0 |
| 3 | 0 |
| 4 | 0 |
| 5 | 0 |
| 6 | 0 |
| 7 | 1 |
| 8 | 1 |
| 9 | 0 |

CALCULATION OF WALK BEHAVIOR SEQUENCE ↑

| NUMBER | WALK BEHAVIOR SEQUENCE |
|---|---|
| 1 | 0 |
| 2 | 0 |
| 3 | 0 |
| 4 | 0 |
| 5 | 1 |
| 6 | 1 |
| 7 | 0 |
| 8 | 0 |
| 9 | 1 |

| NUMBER | STOP BEHAVIOR SEQUENCE |
|---|---|
| 1 | 1 |
| 2 | 1 |
| 3 | 1 |
| 4 | 1 |
| 5 | 0 |
| 6 | 0 |
| 7 | 0 |
| 8 | 0 |
| 9 | 0 |

STOP POSITION SET SP: SET OF STOP BEHAVIOR STARTING POINTS
IN STOP BEHAVIOR SEQUENCE S
(1: STOP STATE, 0: NON-STOP STATE)

EXAMPLE)
WHEN $S_6$ IS FIRST STOP POSITION
$sp_1 = 6$

BEHAVIOR RECOGNITION USING VECTORS OF MOTION PROPERTIES BASED TRAJECTORY AND MOVEMENT TYPE

CROSS-REFERENCE TO RELATED APPLICATIONS

This application is based upon and claims the benefit of priority from the prior Japanese Patent Applications No. 2006-59923 filed on Mar. 6, 2006, the entire contents of which are incorporated herein by reference.

BACKGROUND OF THE INVENTION

1. Field of the Invention

The present invention relates to a behavior determining apparatus, a behavior determining method, and a computer program.

2. Related Art

A behavior determining technique in an actual space of a human is an important object of researches and developments. Various models have been proposed for the behavior determining technique.

An application range of the behavior determining technique is diversified. Examples of the application range include a care technique in a care facility and the like, a suspicious character finding technique in various facilities, and a customer behavior analyzing technique in retail shops. On the other hand, according to the development of ubiquitous devices represented by image processing, RFID (Radio Frequency Identification), and various sensors in recent years, both types and quantities of data used for behavior determination tend to increase. Methods in which such data is used have also been proposed.

In the method, relatively new devices are used in collecting data for behavior determination. However, most of the devices are still being developed and yet to be commercialized. It may be impossible to set the devices because of a physical limitation or use of the devices may be avoided in terms of profit.

SUMMARY OF THE INVENTION

According to an aspect of the present invention, there is provided with a behavior determining apparatus comprising:

an elemental-behavior extracting unit configured to extract, from trajectory data in which positions of a traveling body in an observation area are held at predetermined time intervals, L (L is an integer equal to or larger than 1) elemental behavior quantities among a stopping time representing a total of time during which the traveling body is stopping, a stop frequency representing a number of times the traveling body stops, a walking time representing a total of time during which the traveling body is walking, a running time representing a total of time during which the traveling body is running, a direction change frequency representing a number of times the traveling body changes a traveling direction at an angle equal to or larger than a threshold angle, a sum of angle change quantities at the times when the traveling body changes a traveling direction, a sum of absolute values of angle change quantities at the times when the traveling body changes a traveling direction, a gravitational center set vector representing a set of gravitational centers of stop positions where the traveling body stops in respective divided areas obtained by dividing the observation area, and a pre-stop average speed obtained by averaging speeds immediately before the traveling body stops; and a behavior determining unit configured to determine a behavior of the traveling body from the L elemental behavior quantities.

According to an aspect of the present invention, there is provided with a behavior determining method comprising:

extracting, from trajectory data in which positions of a traveling body in an observation area are held at predetermined time intervals, L (L is an integer equal to or larger than 1) elemental behavior quantities among a stopping time representing a total of time during which the traveling body is stopping, a stop frequency representing a number of times the traveling body stops, a walking time representing a total of time during which the traveling body is walking, a running time representing a total of time during which the traveling body is running, a direction change frequency representing a number of times the traveling body changes a traveling direction at an angle equal to or larger than a threshold angle, a sum of angle change quantities at the times when the traveling body changes a traveling direction, a sum of absolute values of angle change quantities at the times when the traveling body changes a traveling direction, a gravitational center set vector representing a set of gravitational centers of stop positions where the traveling body stops in respective divided areas obtained by dividing the observation area, and a pre-stop average speed obtained by averaging speeds immediately before the traveling body stops; and determining a behavior of the traveling body from the L elemental behavior quantities.

According to an aspect of the present invention, there is provided with a computer program for causing a computer to execute instructions to perform steps of:

extracting, from trajectory data in which positions of a traveling body in an observation area are held at predetermined time intervals, L (L is an integer equal to or larger than 1) elemental behavior quantities among a stopping time representing a total of time during which the traveling body is stopping, a stop frequency representing a number of times the traveling body stops, a walking time representing a total of time during which the traveling body is walking, a running time representing a total of time during which the traveling body is running, a direction change frequency representing a number of times the traveling body changes a traveling direction at an angle equal to or larger than a threshold angle, a sum of angle change quantities at the times when the traveling body changes a traveling direction, a sum of absolute values of angle change quantities at the times when the traveling body changes a traveling direction, a gravitational center set vector representing a set of gravitational centers of stop positions where the traveling body stops in respective divided areas obtained by dividing the observation area, and a pre-stop average speed obtained by averaging speeds immediately before the traveling body stops; and determining a behavior of the traveling body from the L elemental behavior quantities.

BRIEF DESCRIPTION OF THE DRAWINGS

FIG. 2 is a diagram showing nine elemental behavior quantities;

FIG. 14 is a diagram showing an example of calculation of a stop position set;

DETAILED DESCRIPTION OF THE INVENTION

Figure 1:
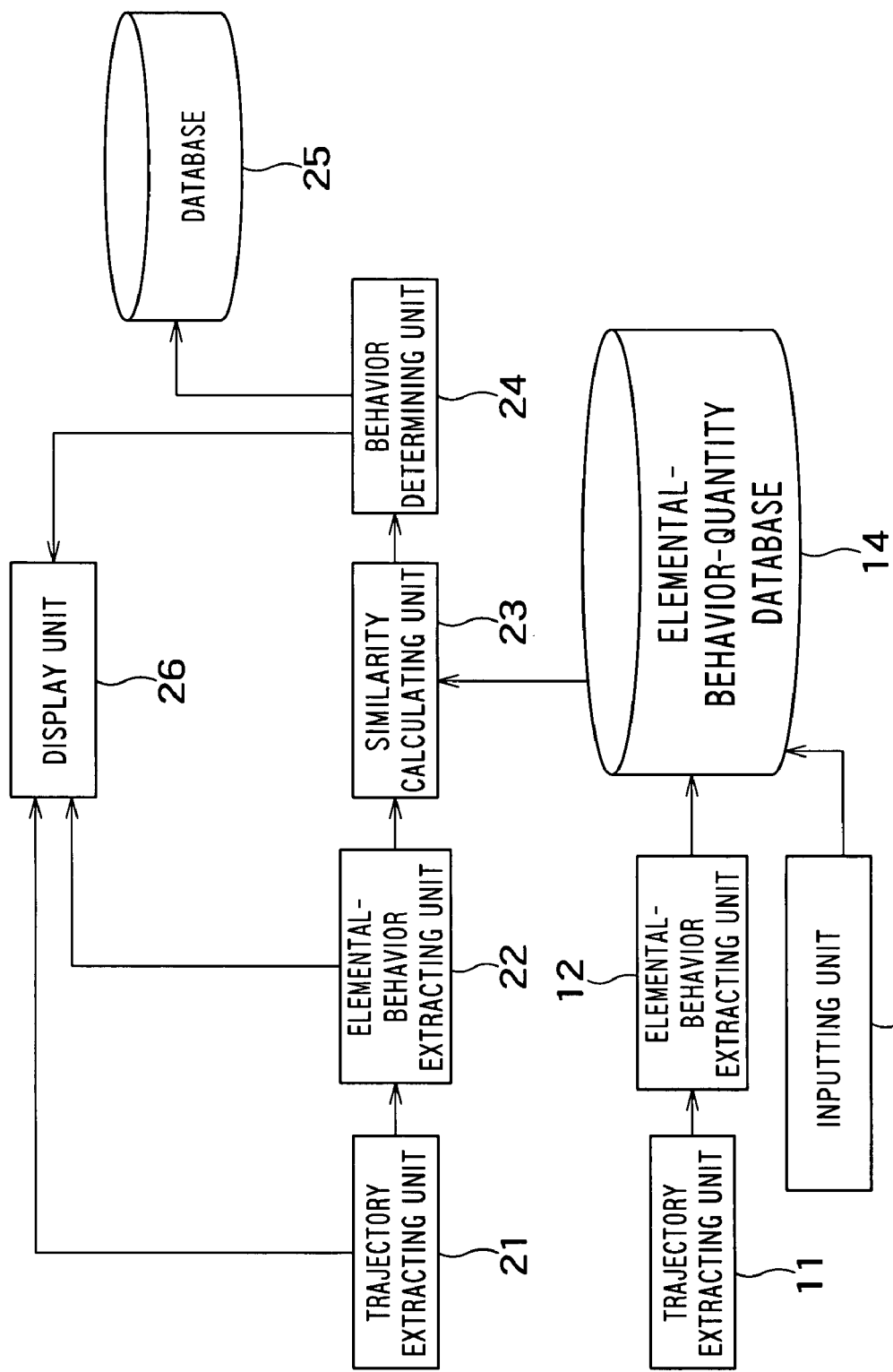
FIG. 1 is a block diagram schematically showing a behavior determining apparatus according to an embodiment of the invention.

FIG. 1 is a block diagram schematically showing an overall structure of a behavior determining apparatus according to an embodiment of the invention. This behavior determining apparatus includes a trajectory extracting unit 11, an elemental-behavior extracting unit 12, an inputting unit 13, an elemental-behavior-quantity database 14, a trajectory extracting unit 21, an elemental-behavior extracting unit 22, a similarity calculating unit 23, a behavior determining unit 24, a database 25, and a display unit 26. It is also possible to cause a computer to execute a program describing instructions for implementing functions by the trajectory extracting unit 11, the elemental-behavior extracting unit 12, the trajectory extracting unit 21, the elemental-behavior extracting unit 22, the similarity calculating unit 23, and the behavior determining unit 24. The behavior determining apparatus in FIG. 1 will be hereinafter explained in detail.

First, the trajectory extracting unit 11, the elemental-behavior extracting unit 12, the inputting unit 13, and the elemental-behavior-quantity database 14 will be explained.

The trajectory extracting unit 11 acquires trajectory data of a traveling body. It is assumed that the traveling body is a traveler (or human). However, the traveling body may be an animal. It is possible to use a digital video camera (an imaging device) as an example of the trajectory extracting unit 11. An example of traveler trajectory data acquired by the trajectory extracting unit 11 is shown on the left side in FIG. 5 described later. Each of rows with numbers 1 to 10 corresponds to one video frame. An X coordinate and a Y coordinate indicate positions of the traveler in an observation area (see FIG. 15 described later). The positions of the traveler are held at frame intervals (predetermined time intervals). The trajectory extracting unit 11 may be separated into a section that images the traveler and a section that extracts a trajectory of the traveler from the imaged data (plural frame images). To extract a trajectory of the traveler from the imaged data, known various image processing techniques can be used.

Trajectory data extracted by the trajectory extracting unit 11 is inputted to the elemental-behavior extracting unit 12. The elemental-behavior extracting unit 12 calculates, on the basis of the trajectory data inputted, nine elemental behavior quantities shown in FIG. 2, that is, a stopping time ST, a stop frequency SE, a walking time WT, a running time RT, a direction change frequency CE, a sum of angle change quantities Q, a sum of absolute values of angle change quantities QA, a gravitational center set vector G, and a pre-stop average speed (an average speed immediately before stop) BS. An elemental-behavior-quantity vector (ST, SE, WT, RT, CE, Q, QA, G, BS) of a traveler trajectory is defined by these elemental behavior quantities. In particular, the sum of angle change quantities Q, the sum of absolute values of angle change quantities QA, the gravitational center set vector G, and the pre-stop average speed BS are some of significant characteristics in this embodiment. It is possible to perform proper behavior determination by using one or more of the nine elemental characteristic quantities. Details of the respective elemental behavior quantities will be described later.

The inputting unit 13 attaches a label to the elemental-behavior-quantity vector (ST, SE, WT, RT, CE, Q, QA, G, BS). As an example, a person performing a certain behavior A is imaged by the trajectory extracting unit 11 to extract trajectory data of the person. An elemental-behavior-quantity vector (ST, SE, WT, RT, CE, Q, QA, G, BS) is calculated by the elemental-behavior extracting unit 12 from the trajectory data extracted. A label of the behavior A is attached to this elemental-behavior-quantity vector (ST, SE, WT, RT, CE, Q, QA, G, BS) using the inputting unit 13. Content of the behavior A may be specified by a user of this apparatus from content of the imaging or may be acquired through an interview with the person. Elemental-behavior-quantity vectors for other behaviors are labeled in the same manner, too. Examples of the labels may include a state of mind at the time when the person cannot decide what to do.

The elemental-behavior-quantity database 14 stores the elemental-behavior-quantity vectors labeled by the inputting unit 13.

Next, the trajectory extracting unit 21, the elemental-behavior extracting unit 22, the similarity calculating unit 23, the behavior determining unit 24, the database 25, and the display unit 26 will be explained.

The trajectory extracting unit 21 and the elemental-behavior extracting unit 22 have functions identical with those of the trajectory extracting unit 11 and the elemental-behavior extracting unit 12. The trajectory extracting unit 21 and the elemental-behavior extracting unit 22 will be explained, although the explanation is partially repetitious.

The trajectory extracting unit 21 acquires traveler trajectory data in the same manner as the trajectory extracting unit 11. As an example of the trajectory extracting unit 21, it is possible to use a digital video camera. The trajectory extracting unit 21 acquires trajectory data of a traveler for whom behavior determination is performed.

The trajectory data extracted by the trajectory extracting unit 21 is inputted to the elemental-behavior extracting unit 22. The elemental-behavior extracting unit 22 calculates, on the basis of the trajectory data inputted, nine elemental behavior quantities, that is, a stopping time ST, a stop frequency SE, a walking time WT, a running time RT, a direction change frequency CE, a sum of angle change quantities Q, a sum of absolute values of angle change quantities QA, a gravitational center set vector G, and a pre-stop average speed BS. The elemental-behavior extracting unit 22 acquires an elemental-behavior-quantity vector (ST, SE, WT, RT, CE, Q, QA, G, BS) of a traveler trajectory according to these elemental behavior quantities. The elemental-behavior extracting unit 22 passes the elemental-behavior-quantity vector acquired (the elemental-behavior-quantity of the input trajectory) to the similarity calculating unit 23.

The similarity calculating unit 23 calculates similarities of the elemental-behavior-quantity vector of the input trajectory passed from the elemental-behavior extracting unit 22 and all the elemental-behavior-quantity vectors stored in the elemental-behavior-quantity database 14, respectively. Various measures are conceivable as a measure of similarity. As an example, there is a Euclidian distance between both the vectors.

The behavior determining unit 24 selects an elemental-behavior-quantity vector most similar to the elemental-behavior-quantity vector of the input trajectory from the elemental-behavior-quantity database 14 and adopts a label attached to selected elemental-behavior-quantity vector as a behavior of the input trajectory (a first determination algorithm). As a method of behavior determination, besides the method described above, classification rules such as a decision tree may be used. In other words, it is also possible to create a classification rule for estimating a behavior from elemental behavior quantities (elemental-behavior-quantity vector) using the elemental-behavior-quantity database 14 and the elemental-behavior-quantity vector of the input trajectory is inputted to this decision tree to determine a behavior (a second determination algorithm). A method of utilizing a result of the determination will be described later.

The database 25 stores a result of the determination by the behavior determining unit 24. Examples of the determination result include "searching for a commodity", "wandering", and "negotiating with a sales clerk at a counter Z". Besides the determination result, the trajectory data, the elemental-behavior-quantity vector of the input trajectory, and the like may be stored.

The display unit 26 displays the trajectory data extracted by the trajectory extracting unit 21, the elemental-behavior-quantity vector extracted by the elemental-behavior extracting unit 22, and the behavior of the traveler determined by the behavior determining unit 24.

Figure 3:
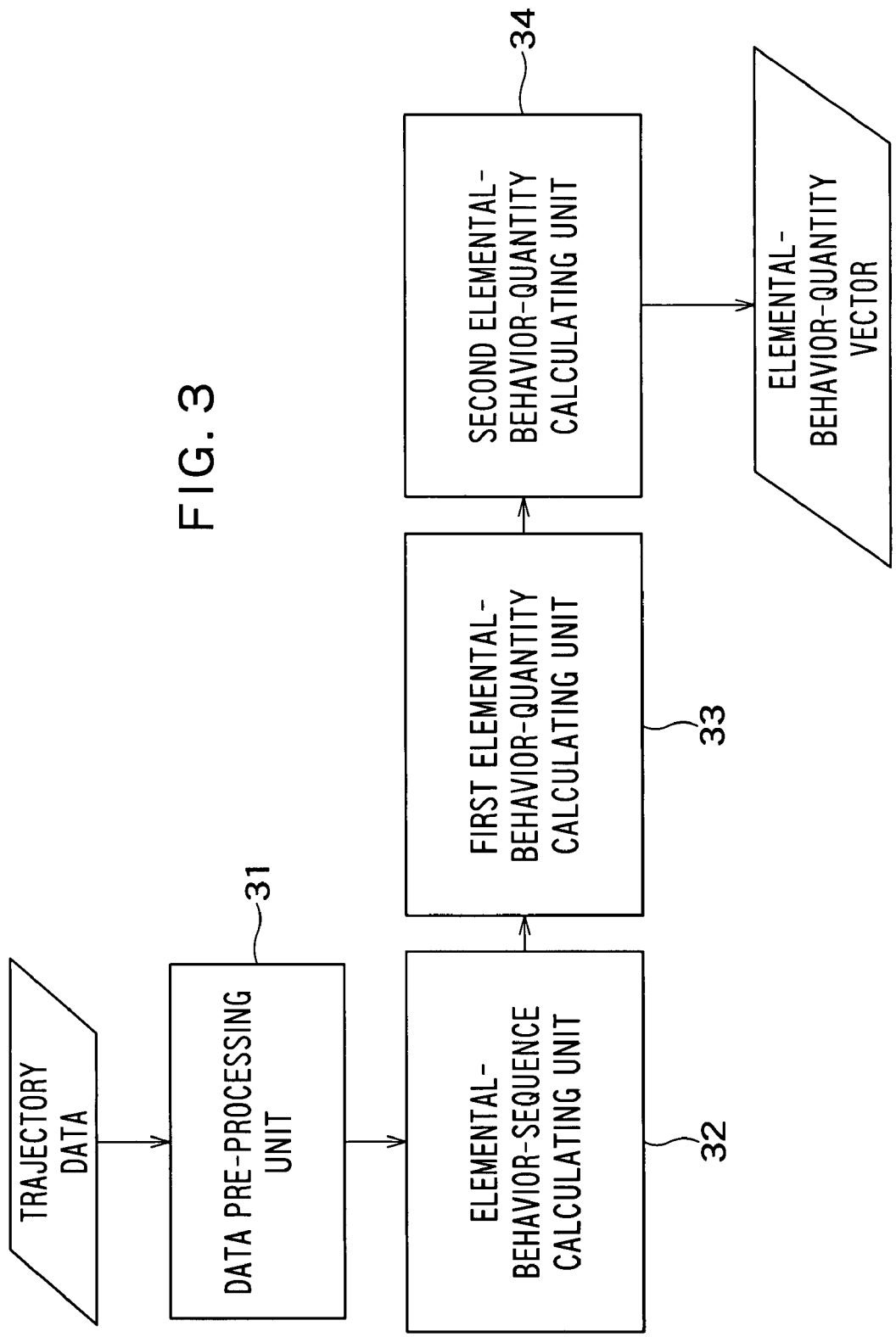
FIG. 3 is a block diagram showing an elemental-behavior extracting unit in detail.

FIG. 3 is a block diagram showing a detailed structure of the elemental-behavior extracting units 22 and 12. Each of the elemental-behavior extracting units 22 and 12 is divided into four modules, that is, a data pre-processing unit 31, an elemental-behavior-sequence calculating unit 32, a first elemental-behavior-quantity calculating unit 33, and a second elemental-behavior-quantity calculating unit 34.

Figure 4:
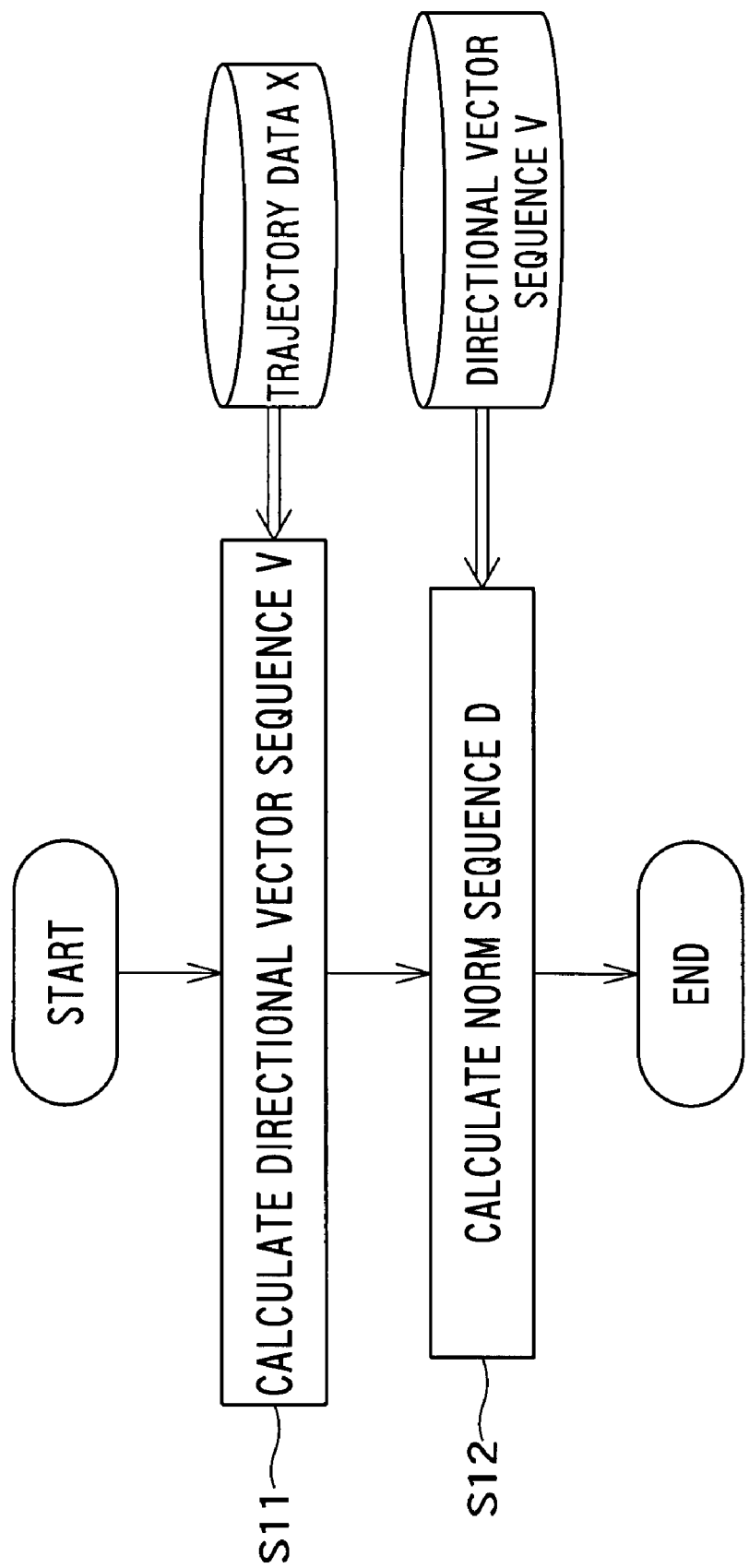
FIG. 4 is a flowchart for explaining a flow of processing by a data pre-processing unit.

FIG. 4 is a flowchart for explaining a flow of processing by the data pre-processing unit 31.

Trajectory data is inputted to the data pre-processing unit 31. The trajectory data is a dot sequence in a two-dimensional real number coordinate system. Respective dots in the dot sequence are equivalent to positions of a traveler at time points corresponding to the respective dots. An example of the trajectory data is shown in the left side in FIG. 5. It is possible to represent the trajectory data as $X=\{x_1, x_2, \ldots, x_{N-1}, x_N\}$. Note that $x_i=(x_i^{(x)}, x_i^{(y)})$. In the example in FIG. 5, $x_1=(x_1^{(x)}, x_1^{(y)})=(1.0, 1.0)$ and $x_2=(x_2^{(x)}, x_2^{(y)})=(2.0, 3.2)$.

Figure 5:
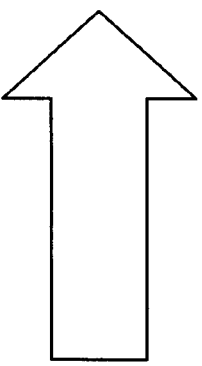
FIG. 5 is a table showing an example of calculation of a directional vector sequence.

In S11, the data pre-processing unit 31 calculates a directional vector sequence $V=\{v_1, v_2, \ldots, v_{N-2}, v_{N-1}\}$ from the trajectory data as indicated on the right side in FIG. 5. Respective elements of V are directional vectors defined between coordinates at respective points in time in the trajectory data. When the coordinates at the respective points in time of the trajectory data are set as $x_i$, the respective elements are calculated as $v_i = x_{i+1} - x_i$. In the example in FIG. 5, when i=1, $v_1 = x_2 - x_1 = (2.0, 3.2) - (1.0, 1.0) = (1.0, 2.2)$.

Figure 6:
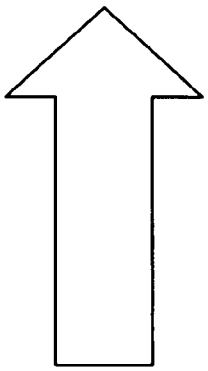
FIG. 6 is a table showing an example of calculation of a norm sequence.

In S12, the data pre-processing unit 31 calculates a norm sequence $D=\{d_1, d_2, \ldots, d_{N-2}, d_{N-1}\}$ using the directional vector sequence V. An example of calculation of the norm sequence D is shown in FIG. 6. In the calculation of the norm sequence D, "lengths" of respective elements of the directional vector sequence are calculated as respective elements of the norm sequence D. In other words, when an ith element of the directional vector sequence V is set as $v_i=(a_i, b_i)$, the ith element of the norm sequence D is calculated as $d_i = \sqrt{a_i^2 + b_i^2}$. In the example in FIG. 6, when i=1, $d_1 = (1^2 + 2.2^2)^{1/2} = 2.417$.

Figure 7:
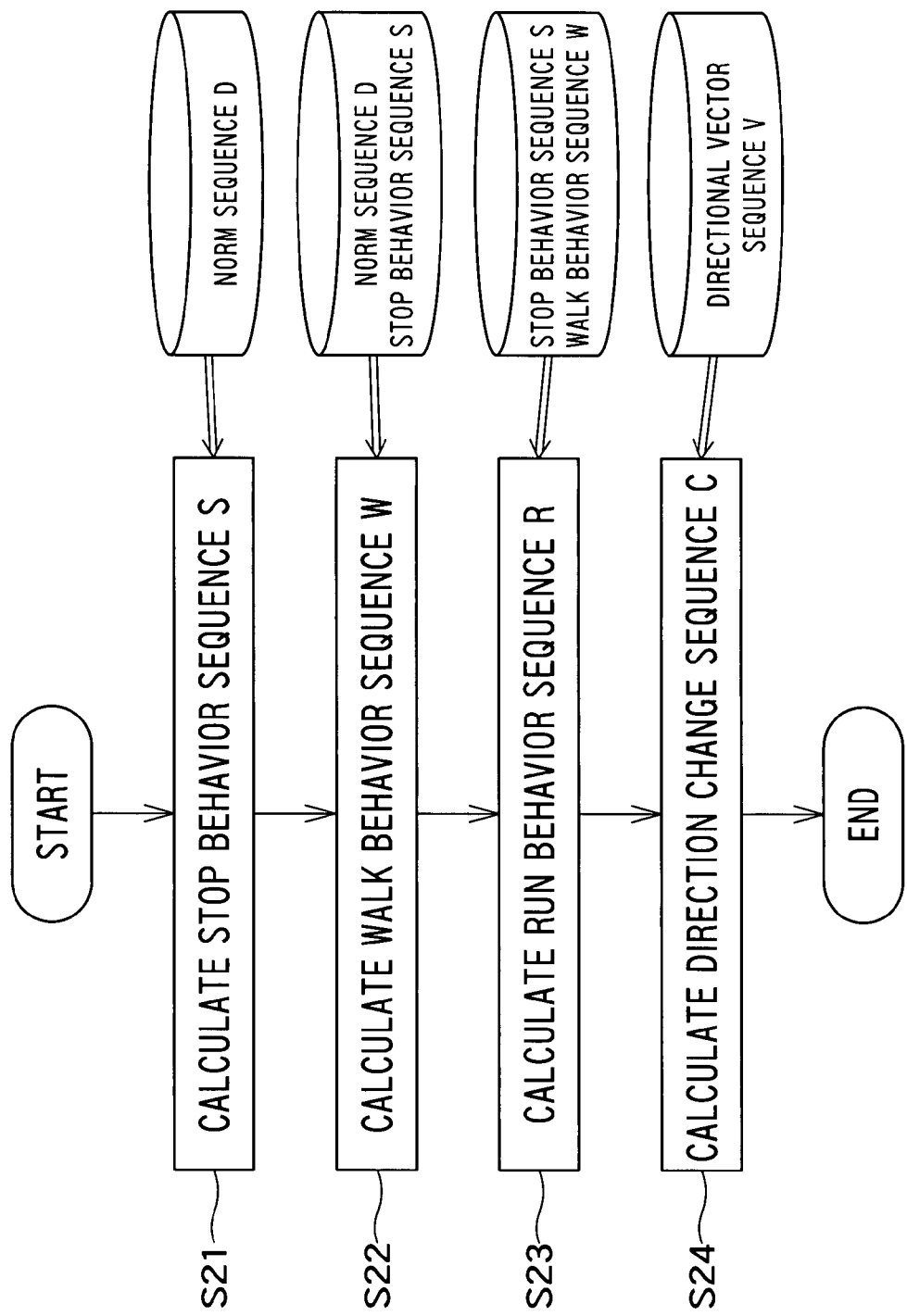
FIG. 7 is a flowchart showing a flow of processing by an elemental-behavior-sequence calculating unit.

FIG. 7 is a flowchart showing a flow of processing by the elemental-behavior-sequence calculating unit 32.

Figure 8:
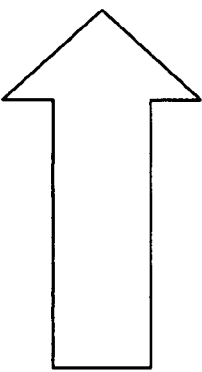
FIG. 8 is a table showing an example of calculation of a stop behavior sequence.

In S21, the elemental-behavior-sequence calculating unit 32 calculates a stop behavior sequence $S=\{s_1, s_2, \ldots, s_{N-2}, s_{N-1}\}$ using the norm sequence D. An example of the calculation of the stop behavior sequence S is shown in FIG. 8. The stop behavior sequence is a sequence of 0 and 1. A suffix "i" of the element $s_i$ corresponds to a pertinent frame interval. Intuitively, in a frame interval in which a traveler is stopping (neither walks nor runs), a value of the stop behavior sequence is 1 and, in a frame interval in which the traveler is not stopping, a value of the stop behavior sequence is 0.

Determination of values of the respective elements in the stop behavior sequence S is performed on the basis of a threshold $Th_{stop\&walk}$ (first threshold) and the number of frames F (a threshold number of times) arbitrarily given. The threshold $Th_{stop\&walk}$ is a value estimated from trajectory data of stop and walk, which are separately collected in advance, by assuming a regular distribution in speed of the stop and speed of the walk. The element $s_i$ of the stop behavior sequence S is 1 when continuous F elements including a element di corresponding to the element $s_i$ in the norm sequence are lower than $Th_{stop\&walk}$. An example in which the threshold $Th_{stop\&walk}=3$ and the number of frames F=2 is shown in FIG. 8. For example, when i=4, $d_4=2.546$ is smaller than 3 and $d_3=2.759$ before $d_4$ is also smaller than 3. In other words, both continuous two (=F) elements of the norm sequence are smaller than 3. Thus, $d_4=1$. When i=1, $d_1=2.417$ is smaller than 3 and $d_2=2.147$ after $d_1$ is also smaller than 3. In other words, both continuous two elements of the norm sequence are smaller than 3. Thus, $d_1=1$.

Figure 9:
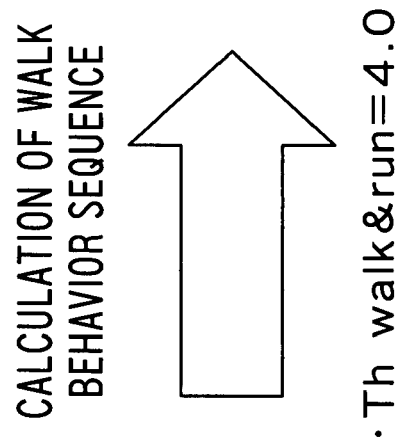
FIG. 9 is a table showing an example of calculation of a walk behavior sequence.

In S22, the elemental-behavior-sequence calculating unit 32 calculates a walk behavior sequence $W=\{w_1, w_2, \ldots, w_{N-2}, w_{N-1}\}$ using the norm sequence D and the stop behavior sequence S. An example of calculation of the walk behavior sequence W is shown in FIG. 9.

The calculation of the walk behavior sequence W is performed on the basis of a threshold $Th_{walk\&run}$ (second threshold). The threshold $Th_{walk\&run}$ is a value estimated from trajectory data of walk and run, which are separately collected in advance, by assuming a regular distribution in the trajectory data of walk and run. When the element $s_i$ of the stop behavior sequence S is 1, the elemental-behavior-sequence calculating unit 32 judges that a behavior of the traveler at a time point "i" has already been decided (judges that the traveler is not walking) and automatically set $w_i$ to 0. When the element $s_i$ of the stop behavior sequence S is 0, the elemental-behavior-sequence calculating unit 32 judges that the traveler is walking if the element $d_i$ of the norm sequence D is equal to or smaller than $Th_{walk\&run}$ and sets $w_i$ to 1. The elemental-behavior-sequence calculating unit 32 judges that the traveler is not walking (the traveler is running) if the element $d_i$ exceeds $Th_{walk\&run}$ and sets $w_i$ to 0. For example, since all of $s_1$ to $s_4$ are 1 in FIG. 8, the elemental-behavior-sequence calculating unit 32 automatically sets $w_1$ to $w_4$ to 0. On the other hand, when i=5, since $s_5$=0 and $d_5$=3.007 ($\leq$4.0), $w_5$=1. When i=7, since $s_7$=0 and $d_7$=5.385 (>4.0), $w_7$=0.

Figure 10:
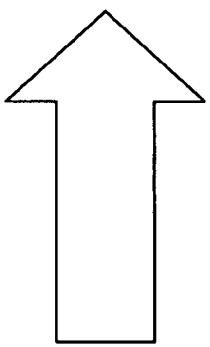
FIG. 10 is a table showing an example of calculation of a run behavior sequence.

In S23, the elemental-behavior-sequence calculating unit 32 calculates a run behavior sequence R={$r_1, r_2, \ldots, r_{N-2}, r_{N-1}$} using the stop behavior sequence S and the walk behavior sequence W. An example of calculation of the run behavior sequence R is shown in FIG. 10.

When $s_i$=0 and $w_i$=0 in the stop behavior sequence S and the walk behavior sequence W, the elemental-behavior-sequence calculating unit 32 judges that the traveler is running and sets the element $r_i$ of the run behavior sequence R to 1. In other words, when the element $s_i$ of the stop behavior sequence S is 0 and the element $d_i$ of the norm sequence D is larger than $Th_{walk\&run}$, the elemental-behavior-sequence calculating unit 32 judges that the traveler is running and sets $r_i$ to 1. On the other hand, when $s_i$=1 or $w_i$=1, the elemental-behavior-sequence calculating unit 32 judges that the traveler is not running and sets $r_i$ to 0. For example, when i=7 and 8, since both $w_i$ and $s_i$ are 0, the elemental-behavior-sequence calculating unit 32 sets $r_7$ and $r_8$ to 1. When i=1 to 6 and 9, since at least one of $w_i$ and $s_i$ is 1, the elemental-behavior-sequence calculating unit 32 sets $r_1$ to $r_6$ and $r_9$ to 0.

Figure 11:
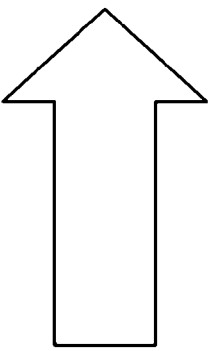
FIG. 11 is a table showing an example of calculation of a direction change sequence.

In S24, the elemental-behavior-sequence calculating unit 32 calculates a direction change sequence C={$c_1, c_2, \ldots, c_{N-2}$} using the directional vector sequence V. An example of calculation of the direction change sequence C is shown in FIG. 11.

Respective elements $c_i$ in the direction change sequence C are determined according to an angle formed by elements adjacent to each other in the direction vector sequence V. When an angle formed by $v_i$ and $v_{i+1}$ is equal to or larger than a threshold angle (assumed to be $\pi/2$), the elemental-behavior-sequence calculating unit 32 judges that the traveler has changed a direction and sets the elements $c_i$ to 1. When the angle is smaller than the threshold angle, the elemental-behavior-sequence calculating unit 32 sets the elements $c_i$ to 0. Specifically, as a method of determination, determination on positive and negative of an inner product is adopted. In other words, when $v_i$=($a_i, b_i$) and $v_{i+1}$=($a_{i+1}, b_{i+1}$), when $a_i a_{i+1} + b_i b_{i+1}$ is equal to or smaller than 0, the elements $c_i$ are 1. In other cases, the elements $c_i$ are 0.

Figure 12:
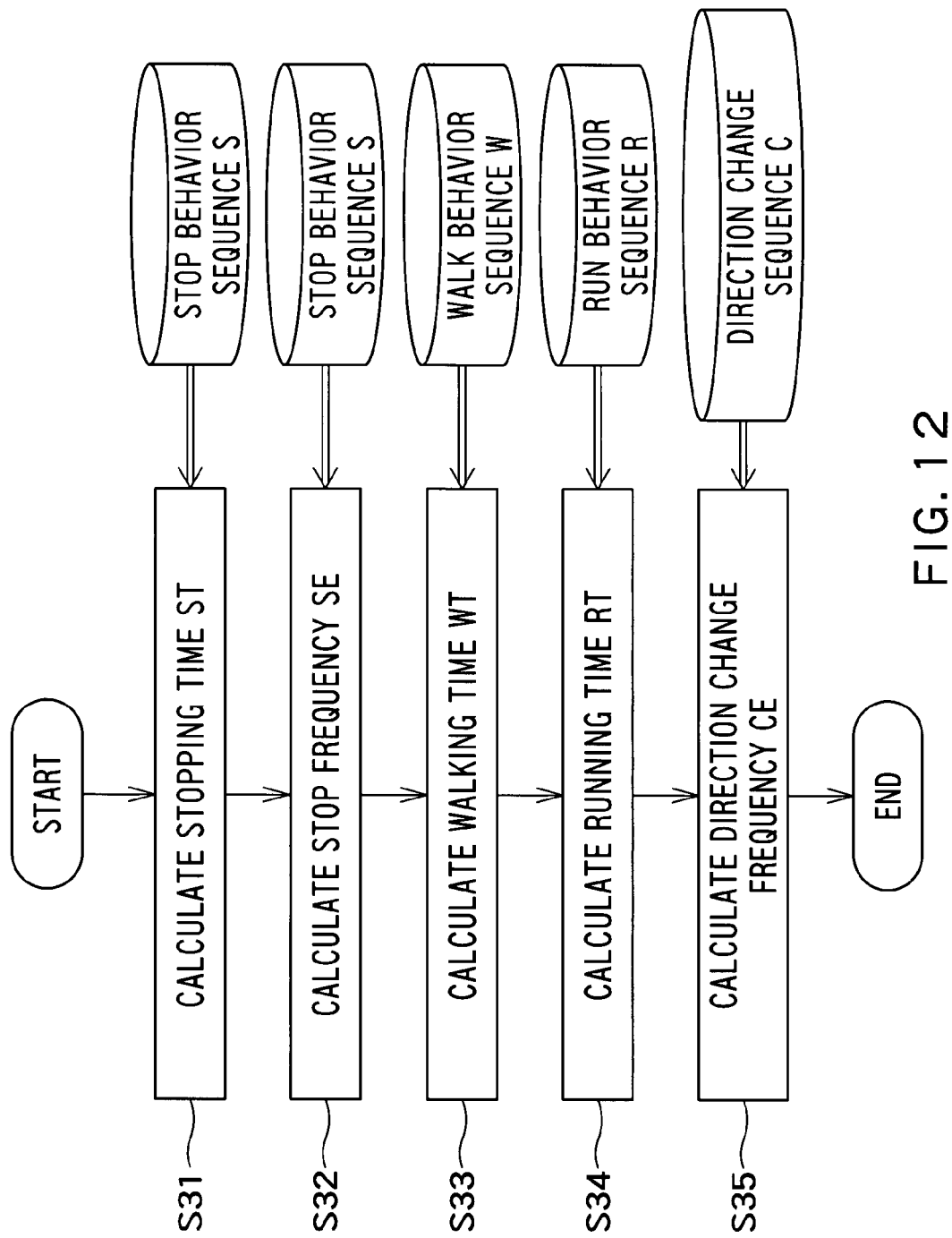
FIG. 12 is a flowchart showing a flow of processing by a first elemental-behavior-quantity calculating unit.

FIG. 12 is a flowchart showing a flow of processing by the first elemental-behavior-quantity calculating unit 33.

In S31, the first elemental-behavior-quantity calculating unit 33 calculates a stopping time ST using the stop behavior sequence S. The stopping time ST is obtained by calculating a sum of stop behavior sequences S and multiplying the sum by a frame interval time T. In other words, the stopping time ST represents a total of time during which the traveler is stopping.

In S32, the first elemental-behavior-quantity calculating unit 33 calculates the stop frequency SE using the stop behavior sequence S. The stop frequency SE is obtained as the number of times of appearance of continuous sequences of elements having a value 1 in the stop behavior sequence S. For example, when the stop behavior sequence S={00000110000001111111100000011111110000}, since the number of continuous sequences of elements having a value 1 is three, SE=3. In other words, the stop frequency SE represents the number of times the traveler stops.

In S33, the first elemental-behavior-quantity calculating unit 33 calculates a walking time WT using the walk behavior sequence W. The walking time WT is obtained by calculating a sum of walk behavior sequences W and multiplying the sum by the frame interval time T. In other words, the walking time WT represents a total of time during which the traveler is walking.

In S34, the first elemental-behavior-quantity calculating unit 33 calculates a running time RT using the run behavior sequence R. The running time RT is obtained by calculating a sum of run behavior sequences R and multiplying the sum by the frame interval time T. In other words, the running time RT represents a total of time during which the traveler is running.

In S35, the first elemental-behavior-quantity calculating unit 33 calculates the direction change frequency CE using the direction change sequence C. The direction change frequency CE is obtained by calculating a sum of direction change sequences CE. In other words, the direction change frequency CE represents the number of times the traveler changes a direction at an angle equal to or larger than the threshold angle. More specifically, the number of times of direction vectors adjacent to each other forming an angle equal to or larger than the threshold angle is equivalent to the direction change frequency.

Figure 13:
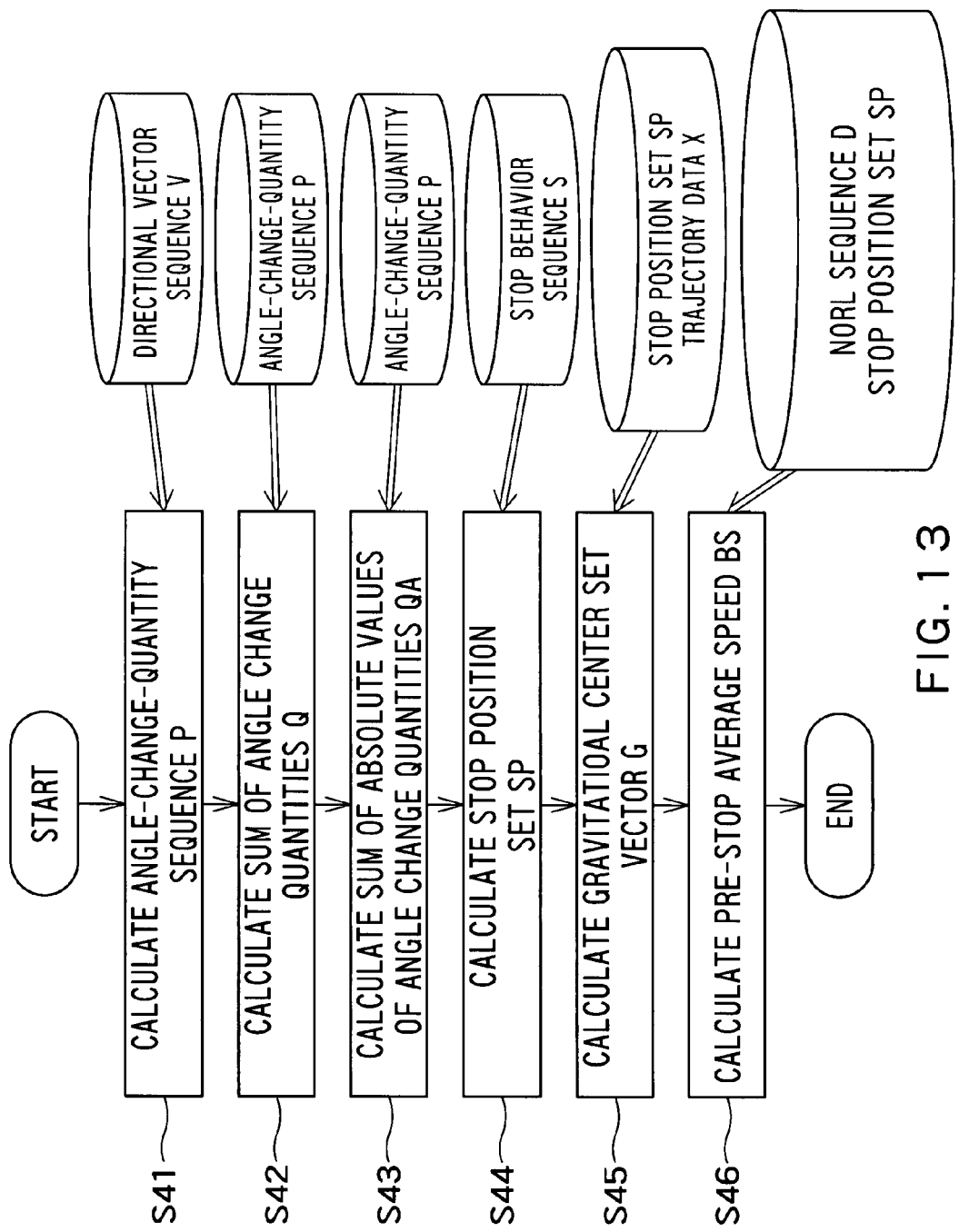
FIG. 13 is a flowchart showing a flow of processing by a second elemental-behavior-quantity calculating unit.

FIG. 13 is a flowchart showing a flow of processing by the second elemental-behavior-quantity calculating unit 34.

In S41, the second elemental-behavior-quantity calculating unit 34 calculates an angle-change-quantity sequence P={$p_1, p_2, \ldots, p_{N-2}$} using the directional vector sequence V. Values of respective elements $p_1$ of the angle-change-quantity sequence P are circular method values of angles formed by elements $v_i$ and $v_{i+1}$ of the directional vector sequence V and are values in a range from $-\pi$ to $\pi$ (inclusive). Intuitively, when the traveler turns to the right, the values are positive values and, when the traveler turns to the left, the values are negative values.

In S42, the second elemental-behavior-quantity calculating unit 34 calculates a sum of angle change quantities Q using the angle-change-quantity sequence P. The sum of angle change quantities Q is obtained by calculating a sum of angle-change-quantity sequences P. As a characteristic of this value, when the traveler rotates to the left and the right by the same angle, values of Q cancel each other to be 0. In other words, the sum of angle change quantity is obtained by totaling angle change quantities at the times when the traveler changes a traveling direction.

In S43, the second elemental-behavior-quantity calculating unit 34 calculates a sum of absolute values of angle change quantities QA using the angle-change-quantity sequence P. The sum of absolute values of angle change quantities QA is obtained by calculating a sum of absolute values |$p_i$| of angle elements $p_i$ of the angle-change-quantity sequence P. In other words, the sum of absolute values of angle change quantities QA is obtained by totaling absolute values of angle change quantities at the times when the traveler changes a traveling direction.

In S44, the second elemental-behavior-quantity calculating unit 34 calculates a stop position set SP using the stop behavior sequence S. An example of calculation of the stop position set SP is shown in FIG. 14. The stop position set SP is a set of start positions of a stop behavior. Specifically, respective elements $sp_i$ of the stop position set SP are start positions of respective continuous sequences of 1 included in the stop behavior sequence S. In the example in FIG. 14, since three continuous sequences of 1 are shown in the stop behavior sequence S and start positions of the respective continuous sequences are 6, 14, and 28, a stop position set is SP={6, 14, 28, . . . }. In other words, a stop position of the stop behavior is equivalent to an interval starting position of a position interval at the top of plural position intervals where the traveler continuously is stopping.

Figure 15:
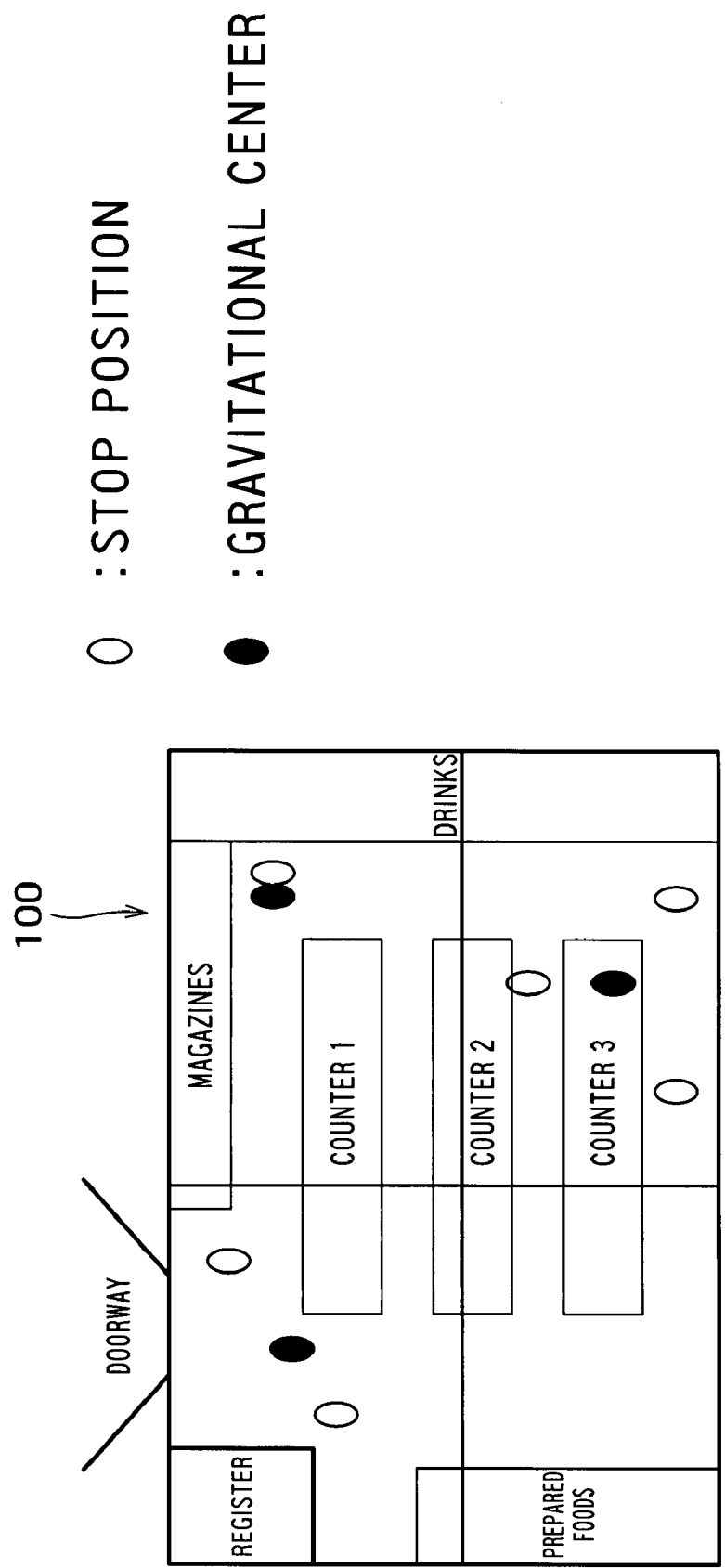
FIG. 15 is a diagram for explaining an example of calculation of a gravitational center set vector.

In S45, the second elemental-behavior-quantity calculating unit 34 calculates a gravitational center set vector G using the stop position set SP and the trajectory data X. FIG. 15 is shown in order to explain an example of calculation of the gravitational center set vector G.

An observation area 100 is divided into N areas given arbitrarily. In this example, N is set to four. In this example, the observation area 100 is divided such that the respective divided areas are square. However, a method of division is not limited to this. The second elemental-behavior-quantity calculating unit 34 calculates, for each area "i" (in this example, i=1 to 4), a gravitational center (average position) $g_i$ of stop positions on the basis of the stop position set SP and the trajectory data X. A gravitational center of an area in which no stop position is present is set to 0. The gravitational center set vector G is represented as $G=\{g_1, g_2, \ldots, g_N\}$ using gravitational centers of the respective areas. In other words, the gravitational center set vector G includes gravitational center of positions where the traveler perform stop behaviors in the respective divided areas.

In S46, the second elemental-behavior-quantity calculating unit 34 calculates a pre-stop average speed BS using the norm sequence D, the stop position set SP, and an arbitrary integer K given. The second elemental-behavior-quantity calculating unit 34 obtains individual pre-stop average speed by calculating, for each of the stop positions indicated in the stop position set SP, an average of norm sequences from the stop position to a position K time points before. The second elemental-behavior-quantity calculating unit 34 calculates an average of individual pre-stop average speeds calculated for all the stop positions and sets the average as pre-stop average speed BS. In other words, the pre-stop average speed BS represents an average of speeds immediately before the traveler stops in the respective stop positions.

Consequently, the elemental-behavior extracting units 22 and 12 obtain the elemental-behavior-quantity vector PV= (ST, SE, WT, RT, CE, Q, QA, G, BS) shown in FIG. 2. In this embodiment, the first elemental-behavior-quantity calculating unit 33 and the second elemental-behavior-quantity calculating unit 34 are provided separately. However, the first elemental-behavior-quantity calculating unit 33 and the second elemental-behavior-quantity calculating unit 34 may be integrated and the processing in FIGS. 12 and 13 may be performed in the integrated calculating unit.

Figure 16:
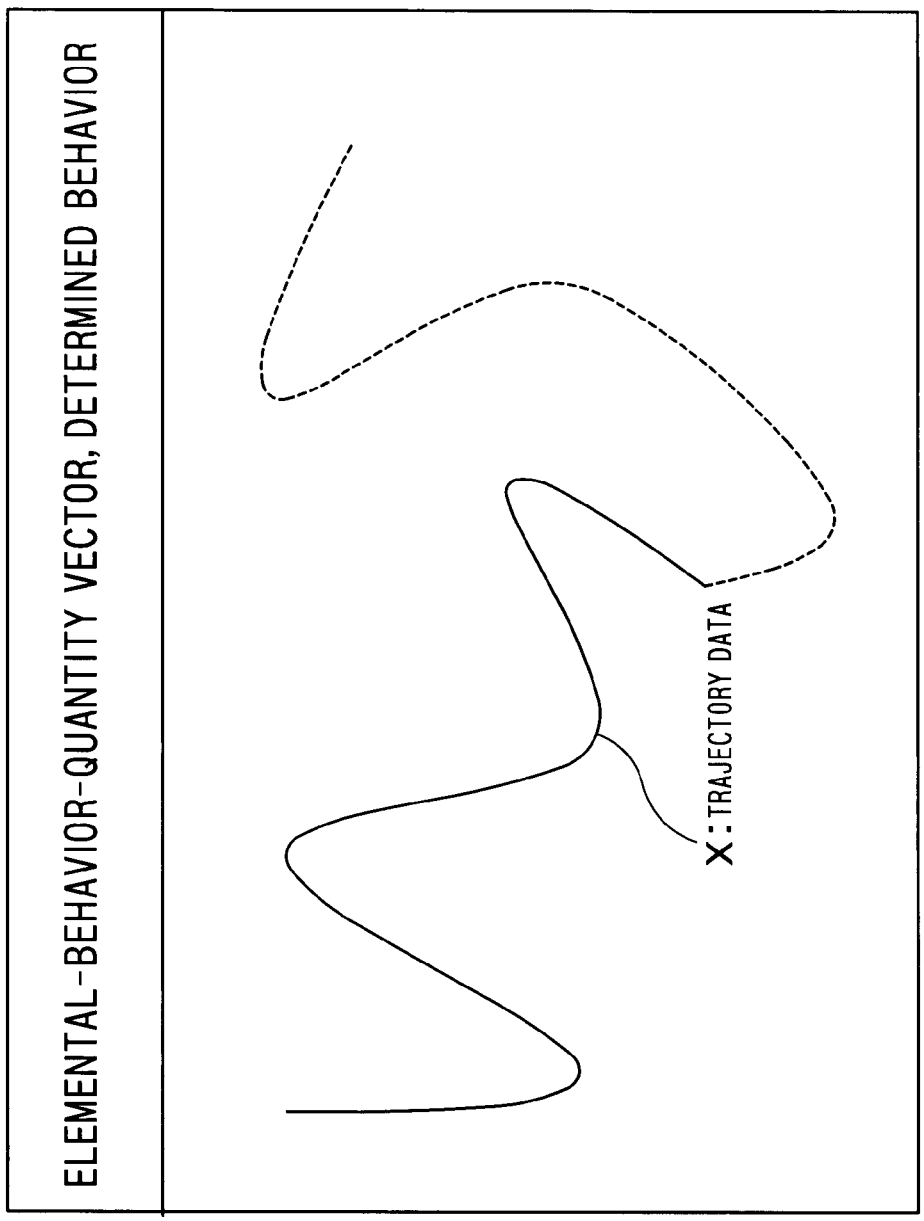
FIG. 16 is a diagram showing a screen image of a display unit.

FIG. 16 shows a screen image of the display unit 26.

An input trajectory (trajectory data X) is displayed in a lower part of the screen. The trajectory displayed may be displayed in line types, colors, or the like corresponding to the state of stop, walk, and run, respectively. In this example, it is assumed that walk is displayed with a solid line and run is displayed with a broken line.

On the other hand, an elemental-behavior-quantity vector PV obtained from the input trajectory and a behavior determined by the behavior determining unit (a label attached to an elemental-behavior-quantity vector selected from the elemental-behavior-quantity database 14 or a behavior represented by this label) are displayed in an upper part of the screen. The behavior displayed is, for example, one behavior determined from the input trajectory displayed in the lower part of the screen.

It is possible to realize, for example, improvement of profitability of a retail shop by using the embodiment explained above. Specifically, behaviors (labels) to be determined such as "wandering" and "negotiating with a sales clerk" are stored in the elemental-behavior-quantity database in advance in association with elemental-behavior-quantity vectors. A behavior of a shopper is determined by comparing an elemental-behavior-quantity vector acquired from an input trajectory of the shopper and the respective elemental-behavior-quantity vectors in the elemental-behavior-quantity database. Data indicating a behavior determined is stored in the database 25. It is possible to obtain improvement measures for shop, such as "Since there are many people who question where commodities to purchase are, a layout of commodities should be changed to allow the people to easily understand where the commodities are." and "In this counter, most shoppers do not negotiate with sales clerks. It is necessary to replace commodities".

It is also possible to use this embodiment for prevention of crime. Specifically, it is also possible to perform behavior determination for suspicious behaviors by storing elemental-behavior-quantity vectors attached with labels indicating the suspicious behaviors in the elemental-behavior-quantity database. This makes it possible to detect a suspicious character.

It is possible to utilize the existing infrastructure such as a security camera since a video camera can be used as the trajectory extracting unit as in this embodiment. This makes it possible to introduce this embodiment at low cost.

What is claimed is:

1. A behavior determining apparatus comprising:
    an elemental-behavior extracting unit configured to extract, from trajectory data in which positions of a traveling body in an observation area are held at predetermined time intervals, L (L is an integer equal to or larger than 1) elemental behavior quantities among
        a stopping time representing a total of time during which the traveling body is stopping,
        a stop frequency representing a number of times the traveling body stops,
        a walking time representing a total of time during which the traveling body is walking,
        a running time representing a total of time during which the traveling body is running,
        a direction change frequency representing a number of times the traveling body changes a traveling direction at an angle equal to or larger than a threshold angle,
        a sum of angle change quantities at the times when the traveling body changes a traveling direction,
        a sum of absolute values of angle change quantities at the times when the traveling body changes a traveling direction,
        a gravitational center set vector representing a set of gravitational centers of stop positions where the traveling body stops in respective divided areas obtained by dividing the observation area, and
        a pre-stop average speed obtained by averaging speeds immediately before the traveling body stops; and
    a behavior determining unit configured to determine a behavior of the traveling body from the L elemental behavior quantities.

2. The apparatus according to claim 1, wherein the elemental-behavior extracting unit
    calculates distances of each position interval which is an interval between two positions adjacent to each other from the trajectory data, detects sequences of position intervals whose distances are smaller than a first threshold and which are successive more than a threshold number of times, and calculates the stopping time by multiplying a number of times of position intervals included in the sequences by the predetermined time interval.

3. The apparatus according to claim 1, wherein the elemental-behavior extracting unit calculates distances of each position interval which is an interval between two positions adjacent to each other from the trajectory data, detects sequences of position intervals whose distances are smaller than a first threshold and which are successive more than a threshold number of times, and determines a number of times of sequences as the stop frequency.

4. The apparatus according to claim 1, wherein the elemental-behavior extracting unit calculates distances of each position interval which is an interval between two positions adjacent to each other from the trajectory data, detects sequences of position intervals whose distances are smaller than a first threshold and which are successive more than a threshold number of times, and detects second position intervals having a distance equal to or smaller than a second threshold among all position intervals except position intervals included in the sequences, and calculates the walking time by multiplying a number of times of detected second position intervals by the predetermined time interval.

5. The apparatus according to claim 1, wherein the elemental-behavior extracting unit calculates distances of each position interval which is an interval between two positions adjacent to each other from the trajectory data, detects position intervals having a distance larger than a second threshold, and calculates the running time by multiplying a number of times of detected position intervals by the predetermined time interval.

6. The apparatus according to claim 1, wherein the elemental-behavior extracting unit calculates vectors between two positions adjacent to each other from the trajectory data, respectively calculates angles formed by two vectors adjacent to each other, respectively, and determines a number of times of angles which are equal to or larger than a threshold angle, as the direction change frequency.

7. The apparatus according to claim 1, wherein the elemental-behavior extracting unit calculates vectors between two positions adjacent to each other from the trajectory data, respectively, calculates angles formed by two vectors adjacent to each other, respectively, and calculates the sum of angle change quantities by totaling respective calculated angles.

8. The apparatus according to claim 1, wherein the elemental-behavior extracting unit calculates vectors between two positions adjacent to each other from the trajectory data, respectively, calculates angles formed by two vectors adjacent to each other, respectively, and calculates the sum of absolute values of angle change quantities by totaling absolute values of respective calculated angles.

9. The apparatus according to claim 1, wherein the elemental-behavior extracting unit calculates distances of each position interval which is an interval between two positions adjacent to each other from the trajectory data, detects sequences of position intervals whose distances are smaller than a first threshold and which are successive more than a threshold number of times, detects interval starting positions of position intervals at the top of the sequences, as the stop positions.

10. The apparatus according to claim 1, wherein the elemental-behavior extracting unit calculates distances of each position interval which is an interval between two positions adjacent to each other from the trajectory data, detects sequences of position intervals whose distances are smaller than a first threshold and which are successive more than a threshold number of times, detects interval starting positions of position intervals at the top of the sequences, as the stop positions, and calculates averages of distances of position intervals in respective ranges from the respective stop positions to a position a predetermined number of position intervals before, respectively, and calculates the pre-stop average speed by averaging calculated averages.

11. The apparatus according to claim 1, further comprising an elemental-behavior-quantity database configured to store plural data pieces each including L elemental behavior quantities and a behavior, wherein the behavior determining unit detects L elemental behavior quantities satisfying a similarity condition given in advance with the L elemental behavior quantities extracted by the elemental-behavior extracting unit from the database, and determines a behavior associated with detected L elemental behavior quantities in the database as a behavior of the traveling body.

12. The apparatus according to claim 1, further comprising a display unit configured to display the trajectory data, the L elemental behavior quantities extracted by the elemental-behavior extracting unit, and the behavior of the traveling body.

13. The apparatus according to claim 1, further comprising a trajectory extracting unit configured to extract trajectory data of a traveling body from plural frame images obtained by imaging the traveling body traveling in the observation area.

14. A behavior determining method comprising:

extracting, from trajectory data in which positions of a traveling body in an observation area are held at predetermined time intervals, L (L is an integer equal to or larger than 1) elemental behavior quantities among a stopping time representing a total of time during which the traveling body is stopping, a stop frequency representing a number of times the traveling body stops, a walking time representing a total of time during which the traveling body is walking, a running time representing a total of time during which the traveling body is running, a direction change frequency representing a number of times the traveling body changes a traveling direction at an angle equal to or larger than a threshold angle, a sum of angle change quantities at the times when the traveling body changes a traveling direction, a sum of absolute values of angle change quantities at the times when the traveling body changes a traveling direction, a gravitational center set vector representing a set of gravitational centers of stop positions where the traveling body stops in respective divided areas obtained by dividing the observation area, and a pre-stop average speed obtained by averaging speeds immediately before the traveling body stops; and determining a behavior of the traveling body from the L elemental behavior quantities.

15. A computer program for causing a computer to execute instructions to perform steps of:

extracting, from trajectory data in which positions of a traveling body in an observation area are held at predetermined time intervals, L (L is an integer equal to or larger than 1) elemental behavior quantities among a stopping time representing a total of time during which the traveling body is stopping, a stop frequency representing a number of times the traveling body stops, a walking time representing a total of time during which the traveling body is walking, a running time representing a total of time during which the traveling body is running, a direction change frequency representing a number of times the traveling body changes a traveling direction at an angle equal to or larger than a threshold angle, a sum of angle change quantities at the times when the traveling body changes a traveling direction, a sum of absolute values of angle change quantities at the times when the traveling body changes a traveling direction, a gravitational center set vector representing a set of gravitational centers of stop positions where the traveling body stops in respective divided areas obtained by dividing the observation area, and a pre-stop average speed obtained by averaging speeds immediately before the traveling body stops; and determining a behavior of the traveling body from the L elemental behavior quantities.

* * * * *